US012714647B2

(12) United States Patent
Wang

(10) Patent No.: US 12,714,647 B2
(45) Date of Patent: Aug. 25, 2026

(54) MEDICINE BOTTLE WITH OUTLET NEEDLE

(71) Applicant: Peng Wang, Shanghai (CN)

(72) Inventor: Peng Wang, Shanghai (CN)

( * ) Notice: Subject to any disclaimer, the term of this patent is extended or adjusted under 35 U.S.C. 154(b) by 361 days.

(21) Appl. No.: 18/288,791

(22) PCT Filed: Nov. 11, 2022

(86) PCT No.: PCT/CN2022/131405
§ 371 (c)(1),
(2) Date: Oct. 27, 2023

(87) PCT Pub. No.: WO2024/027040
PCT Pub. Date: Feb. 8, 2024

(65) Prior Publication Data

US 2024/0366475 A1 Nov. 7, 2024

(30) Foreign Application Priority Data

Aug. 5, 2022 (CN) ........................ 202222051936.X
Nov. 4, 2022 (CN) ........................ 202222941397.7

(51) Int. Cl.
*A61J 1/20* (2006.01)
*A61J 1/05* (2006.01)

(52) U.S. Cl.
CPC .................................... *A61J 1/201* (2015.05); *A61J 1/05* (2013.01)

(58) Field of Classification Search
CPC ...... A61M 35/003; A45D 24/22; A45D 34/04
See application file for complete search history.

(56) References Cited

U.S. PATENT DOCUMENTS 5,125,423 A * 6/1992 Butterbrodt ............ A46B 11/00 401/28
5,845,651 A * 12/1998 de Nervo ............. A45D 19/026 132/114

(Continued)

FOREIGN PATENT DOCUMENTS

CN 105456032 A 4/2016
CN 209332917 U 9/2019

(Continued)

OTHER PUBLICATIONS

European Search Report for Application No. 22933870.2, dated Jan. 3, 2025.

(Continued)

*Primary Examiner* — Adam Marcetich
*Assistant Examiner* — Ted Yang
(74) *Attorney, Agent, or Firm* — MARSHALL, GERSTEIN & BORUN LLP

(57) ABSTRACT

A medicine bottle with an outlet needle includes a main bottle body, an end of the main bottle body being provided with an outlet needle, the outlet needle communicating with an inner cavity of the main bottle body; further includes a sub-bottle body, an end of the sub-bottle body being connected with an end cover, the end of the sub-bottle body corresponding to the end cover having a male-connection structure, an end of the main bottle body away from the outlet needle having a female-connection structure, the male-connection structure being adapted to the female-connection structure, a connection between the sub-bottle body and the main bottle body being a fixed and sealed connection after the end cover is removed and the male-connection structure of the sub-bottle body is connected to the female-connection structure of the main bottle body, the (Continued)

sub-bottle body communicating with the inner cavity of the main bottle body.

13 Claims, 8 Drawing Sheets

(56) References Cited

U.S. PATENT DOCUMENTS

| | | | | |
|---|---|---|---|---|
| 6,247,586 | B1 * | 6/2001 | Herzog | B65D 81/3211 215/DIG. 8 |
| 10,441,057 | B1 * | 10/2019 | Tapocik | B65D 41/04 |
| 12,256,821 | B1 * | 3/2025 | Garey | A45D 34/042 |
| 2001/0037095 | A1 * | 11/2001 | Rucinski | A61M 3/0262 604/326 |
| 2004/0124117 | A1 * | 7/2004 | De Laforcade | B65D 1/0246 206/581 |
| 2006/0079851 | A1 * | 4/2006 | Guerrieri | A61M 35/003 604/295 |
| 2006/0283471 | A1 * | 12/2006 | Kimura | B65D 47/2018 118/200 |
| 2006/0285913 | A1 * | 12/2006 | Koptis | B65D 47/242 401/183 |
| 2007/0203504 | A1 * | 8/2007 | Denny | A61M 35/003 606/116 |
| 2007/0233020 | A1 * | 10/2007 | Hearne | B65D 47/18 604/295 |
| 2008/0014011 | A1 * | 1/2008 | Rossen | A61H 15/02 604/20 |
| 2008/0287890 | A1 * | 11/2008 | Foster | A61M 3/0287 604/310 |
| 2009/0192442 | A1 * | 7/2009 | Ignon | A61B 17/32 604/22 |
| 2011/0082415 | A1 * | 4/2011 | Ignon | A61M 37/00 604/22 |
| 2014/0202493 | A1 * | 7/2014 | Zelickson | A47K 7/026 134/6 |
| 2014/0323993 | A1 * | 10/2014 | Wilcox | A61M 35/003 604/311 |
| 2014/0371690 | A1 * | 12/2014 | Sprada | B05B 11/103 604/311 |
| 2015/0101630 | A1 * | 4/2015 | Kodama | A45D 24/26 132/200 |
| 2015/0126944 | A1 * | 5/2015 | Stemer | A61M 35/003 604/290 |
| 2015/0272829 | A1 * | 10/2015 | Tremblay | A61M 5/343 604/414 |
| 2015/0359664 | A1 * | 12/2015 | Herweijer | A61F 7/0085 604/290 |
| 2017/0027302 | A1 * | 2/2017 | Gieux | A45D 40/261 |
| 2018/0280675 | A1 * | 10/2018 | Tharp | A61M 35/003 |
| 2019/0142135 | A1 * | 5/2019 | Murphy | A61M 35/006 401/200 |
| 2021/0060544 | A1 * | 3/2021 | Bartolucci | B01L 3/0293 |
| 2021/0137888 | A1 * | 5/2021 | Sabherwal | A61K 31/4174 |
| 2022/0118236 | A1 * | 4/2022 | Yep | A45D 34/041 |
| 2022/0241154 | A1 * | 8/2022 | Chang | A61M 5/3297 |
| 2023/0180909 | A1 * | 6/2023 | Folchi | A45D 24/22 132/114 |
| 2024/0023687 | A1 * | 1/2024 | Eisenberg | A45D 19/022 |

FOREIGN PATENT DOCUMENTS

| | | | | | |
|---|---|---|---|---|---|
| CN | 111480965 | A | | 8/2020 | |
| CN | 112870542 | A | | 6/2021 | |
| CN | 113908379 | A | | 1/2022 | |
| CN | 215386970 | U | | 1/2022 | |
| CN | 216855499 | U | | 7/2022 | |
| JP | 2011015982 | A | * | 1/2011 | A61J 1/201 |
| JP | 2019198463 | A | | 11/2019 | |

OTHER PUBLICATIONS

International Search Report and Written Opinion for Application No. PCT/CN2022/131405, dated Apr. 21, 2023.

* cited by examiner

MEDICINE BOTTLE WITH OUTLET NEEDLE

CROSS REFERENCE TO RELATED APPLICATIONS

The present application is a US national stage application of PCT international application PCT/CN2022/131405, filed on Nov. 11, 2022, which claims priority to Chinese Patent Application No. 202222051936.X filed on Aug. 5, 2022, and Chinese Patent Application No. 202222941397.7 filed on Nov. 4, 2022, the contents of which are expressly incorporated herein by reference in their entireties.

TECHNICAL FIELD

The present disclosure relates to the field of a medicine bottle technology, and particularly to a medicine bottle with an outlet needle, which is convenient for patients to use medicines.

BACKGROUND

As is well known, the liquid medicine for external application is applied by way of coating. The medicine for the external application is mostly packed in a medicine bottle. When used, the patient opens the bottle and pours out the medicine before coating. At present, there are two modes to apply the liquid medicine for external application. One is to apply the medicine by hand to coat after the patient pours the medicine out; the other is the use of a liquid guide comb, such as in the Chinese disclosure patent with the patent number 2021207607415 disclosing a nursing comb which includes a liquid storage component for storing a liquid, liquid guide comb teeth for exporting the liquid in the liquid storage component; the liquid guide comb teeth are connected with the liquid storage component, and extend out of the liquid storage component. When using, the patient first opens the liquid storage component and the medicine bottle, then pours the liquid in the medicine bottle into the liquid storage component; and then the liquid storage component and the medicine bottle are closed respectively; finally, the patient directs the outlet ends of the liquid guide comb teeth downward and targets the medication area. Under the action of gravity, the liquid in the liquid storage component flows out to the medication area through the outlet ends of the drain comb teeth. The second mode mostly targets areas of the body where the medicine cannot be applied directly, such as the scalp. However, in the above two modes the medicine bottle needs to be opened and closed each time the medicine is applied, and the operation process is tedious. In addition, when the medicine bottle is opened many times, air is easy to enter the medicine bottle to oxidize the medicine, resulting in medicine failure and dissatisfied therapeutic effect, which poses a threat to the health of the patients.

SUMMARY

In view of the above, the present disclosure provides a medicine bottle with an outlet needle. The operation process of the medicine bottle is simple, and the medicine is not easy to be oxidized and ineffective, and the treatment effect is better, there is no risk to the patient's health, accordingly, the technical problems in the prior art that the operation process of the medicine bottle is cumbersome, the medicine is easy to fail, the treatment effect is dissatisfied which results in a risk to the patient's health can be addressed.

The present disclosure provides a medicine bottle with an outlet needle, including a main bottle body, an end of the main bottle body being provided with an outlet needle, and the outlet needle communicating with an inner cavity of the main bottle body; further including a sub-bottle body, an end of the sub-bottle body being connected with an end cover, and the end of the sub-bottle body corresponding to the end cover having a male-connection structure, an end of the main bottle body away from the outlet needle having a female-connection structure, the male-connection structure being adapted to the female-connection structure, a connection between the sub-bottle body and the main bottle body being a fixed and sealed connection after the end cover is removed and the male-connection structure of the sub-bottle body is connected to the female-connection structure of the main bottle body, and the sub-bottle body communicating with the inner cavity of the main bottle body.

In an embodiment, the male-connection structure includes an external thread on an outside wall of an end of the sub-bottle body corresponding to the end cover, the female-connection structure comprises an internal thread on an inside wall of an end of the main bottle body away from the outlet needle, the end of the sub-bottle body corresponding to the end cover is inserted into the end of the main bottle body away from the outlet needle when the sub-bottle body is connected to the main bottle body, and the external thread of the sub-bottle body is adapted to the internal thread of the main bottle body, such that the connection between the sub-bottle body and the main bottle body is the fixed and sealed connection, an inside wall of the end cover is machined with an internal thread, and the internal thread of the end cover is adapted to the external thread of the sub-bottle body.

In an embodiment, a housing is provided around the end of the main bottle body corresponding to the outlet needle.

In an embodiment, the main bottle body includes a support tube and a limit cylinder, one end of the support tube is an abutting end, and the other end has a gland on which the outlet needle is located, the limit cylinder concentrically sleeves outside the support tube, and a bottom of the limit cylinder is pressed against the gland, such that the gland is positioned between the support tube and the limit cylinder, the bottom of the limit cylinder corresponding to the outlet needle is provided with a letting hole for the outlet needle to protrude through.

In an embodiment, a top surface structure of the gland is constructed to be flat.

The top surface of the gland is arranged to be flat, which can prevent breakage of the position on the gland for connecting the connection tube.

In an embodiment, a central convex plate is provided on an inner surface of the bottom of the limit cylinder, a central concave adapted to the central convex plate is provided on the gland, and the central convex plate is located in the central concave.

In an embodiment, a liquid passage is formed between the main bottle body and the sub-bottle body for a liquid medicine to flow to the outlet needle.

In an embodiment, a partition board is provided in the inner cavity of the main bottle body, a board surface of the partition board is fixedly connected in the inner cavity of the main bottle body, the partition board is hollowed out, the sub-bottle body abuts against the partition board after the sub-bottle body is connected to the main bottle body, a hollowed-out structure of the partition board forms the liquid passage.

In an embodiment, the hollowed-out structure of the partition board is a porous structure which passes through in an axial direction and the multiple holes are spaced apart in a circumferential direction of a central axis of the partition board, the number of the holes correspond to the number of outlet needles, and an end of the porous structure communicating with the outlet needles directly communicates with the outlet needles.

In an embodiment, an air passage is formed between the main bottle body and the sub-bottle body to flow excess air in the liquid medicine into atmosphere.

In an embodiment, a surface of the partition board adjacent to the sub-bottle body is configured as a hole-shaped structure arranged through the axial direction, a surface of the partition board away from the sub-bottle body is provided with an installation portion, the air passage passes through the installation portion and the hole-shaped structure and is immersed in the liquid medicine in the sub-bottle body, and the liquid passage is formed between an inner wall of the hole-shaped structure and an outer wall of the air passage.

In an embodiment, the connection between a top surface of the support tube and a top wall of the limit cylinder remains sealed.

In an embodiment, the connection between the support tube and the top wall of the limit cylinder is a sealed and welded connection, and a welding line is formed therebetween.

In an embodiment, the support tube includes a support body, an installation portion is constructed as a third top plate provided in a radial direction of the support body, the partition board is provided radially across an inner wall of the support body, the partition board is spaced apart from the third top plate, a plurality of reinforcing ribs are connected between the partition board and the third top plate, each second reinforcing rib is arranged in a circumferential direction of the third top plate, the partition board is provided with the hole-shaped structure, a plurality of blocking plates are arranged axially on the partition board adjacent to the second reinforcing ribs, the liquid passage is formed among the partition board, two adjacent second reinforcing ribs, and the third top plate.

The support tube is provided with the above-mentioned hole-shaped structure, which allows the medicine bottle to provide the liquid medicine for the outlet needle in time during the application process, and each second reinforcing rib is connected between the partition board and the third top plate, such that the overall structural strength of the support tube is improved.

In an embodiment, the limit cylinder includes a first top plate located on a top surface and a first side wall connected to a bottom surface of the first top plate, the first top plate protrudes from a top surface of the first side wall, a first clamping projection is provided at a connection between the first top plate and the first side wall; accordingly, an edge of an opening of the housing is provided with a convex block, and a detachable clamping connection is provided between the convex block and the first clamping projection.

In an embodiment, an inner wall of the first side wall is provided with at least one first reinforcing rib in an axial direction thereof, an outer wall of the support body is provided with at least one first load-bearing groove in an axial direction thereof, and the first load-bearing groove is matched with the first reinforcing rib.

Such arrangement can prevent the circumferential rotation between the support tube and the limit cylinder.

In an embodiment, a second clamping projection is provided on and protrudes from the top surface of the gland, the second clamping projection is provided with a via hole for the outlet needle to protrude through, the bottom surface of the gland is concave and is provided with a first abutting surface, the first abutting surface is arranged along an edge of the via hole, a bottom projection structure is provided between the first abutting surface and the top surface of the blocking plate and is configured to install and fix the outlet needle.

The projection structure of the bottom portion of the outlet needle is positioned and installed between the first abutting surface and the top surface of the blocking plate, which can improve the installation stability of the outlet needle without requiring an additional limit structure for fixing and installing the outlet needle.

In an embodiment, a venting tube is provided on and protrudes from the top surface of the gland, and the venting tube at a bottom portion thereof communicates with a connection tube, the connection tube is configured to extend into a liquid level of the sub-bottle body; the venting tube and the connection tube together form the air passage.

In an embodiment, the venting tube is constructed to be a plastic structure.

In an embodiment, the venting tube includes a hose body which is gradually reduced in a radial dimension along an outflow direction of the liquid, a top surface of the hose body is provided with a hose cover, and the hose cover is provided with a gap hole for air to flow.

The air in the liquid medicine in the sub-bottle body can be timely expelled into the atmosphere through the gap hole, such that the air pressure in the sub-bottle body is consistent with the atmospheric pressure.

In an embodiment, a third clamping projection is provided on and protrudes from the bottom surface of the gland, and the third clamping projection is configured to perform a nested installation with the connection tube.

In an embodiment, the board surface of the partition board and the inner cavity of the main bottle body are formed in one piece.

In an embodiment, the sub-bottle body includes a first segment body, a second segment body, and a third segment body; the first segment body and the third segment body both have fixed diameters, the second segment body has a changing diameter; a diameter of the first segment body is larger than that of the third segment body; one end of the first segment body is a closed end, the other end is connected to an end of the second segment body with a larger diameter; an end of the second segment body with a smaller diameter is connected to an end of the third segment body; the end cover is located at the other end of the third segment body; the external thread is machined on an outside wall of the third segment body; an outer diameter of the first segment body is equal to an outer diameter of the limit cylinder; the opening end of the limit cylinder protrudes from an end of the support tube away from the gland, such that the opening end of the limit cylinder encloses the second segment body after the main bottle body is connected to the sub-bottle body.

By the above solution, advantages are provided as follows: since an end of the sub-bottle body of the medicine bottle provided with an outlet needle is connected with the end cover, and the end of the sub-bottle body corresponding to the end cover has a male-connection structure, an end of the main bottle body away from the outlet needle has a female-connection structure, the connection between the sub-bottle body and the main bottle body is a fixed and sealed connection after the end cover is removed and the male-connection structure of the sub-bottle body is connected to the female-connection structure of the main bottle body. When such medicine bottle is manufactured, the medicine is added into the sub-bottle body. When abutting, the end cover of the sub-bottle body is removed and the sub-bottle body is connected to the main bottle body in the fixing and sealing mode through the male-female connection structure, the liquid medicine can be applied by means of the outlet needle. After the liquid medicine is applied, the sub-bottle body does not need to be removed and waits for the next use until the liquid medicine in the sub-bottle body is used up; the sub-bottle body in which the liquid medicine is used up is removed, a new sub-bottle body can be connected to the main bottle body to use. When the medicine bottle is used, the medicine is directly packaged in the sub-bottle body. After the sub-bottle body and the main bottle body are assembled, the two are integrated. Before the medicine in the sub-bottle body is used up, there is no need to assemble again, which avoids repeated filling of the liquid medicine, and the application process of the medicine is greatly simplified. In addition, there is no need for multiple filling, the operation process is simple, and the medicine is not easy to be oxidized. The outlet needle has a head structure of a ballpoint pen, and the air is substantially unable to enter, which ensures that the treatment effect of the medicine is always better, and there is no risk to the patient's physical health.

The above description is only a summary of the technical solution of the present disclosure, and can be implemented in accordance with the disclosure of the specification in order to be able to understand the technical means of the present disclosure more clearly; and in order to make the above and other purposes, features and advantages of the present disclosure more obviously understandable, specific embodiments of the present disclosure are provided as follows.

BRIEF DESCRIPTION OF THE DRAWINGS

By reading the detailed description of the preferred embodiments below, various advantages and benefits will become clearer to these skilled in the field. The accompanying drawings are merely utilized to indicate the purpose of the preferred embodiments, rather than a limitation to the disclosure. Further, in all the drawings, the same reference signs represent the same parts. In the accompanying drawings.

Figure 1:
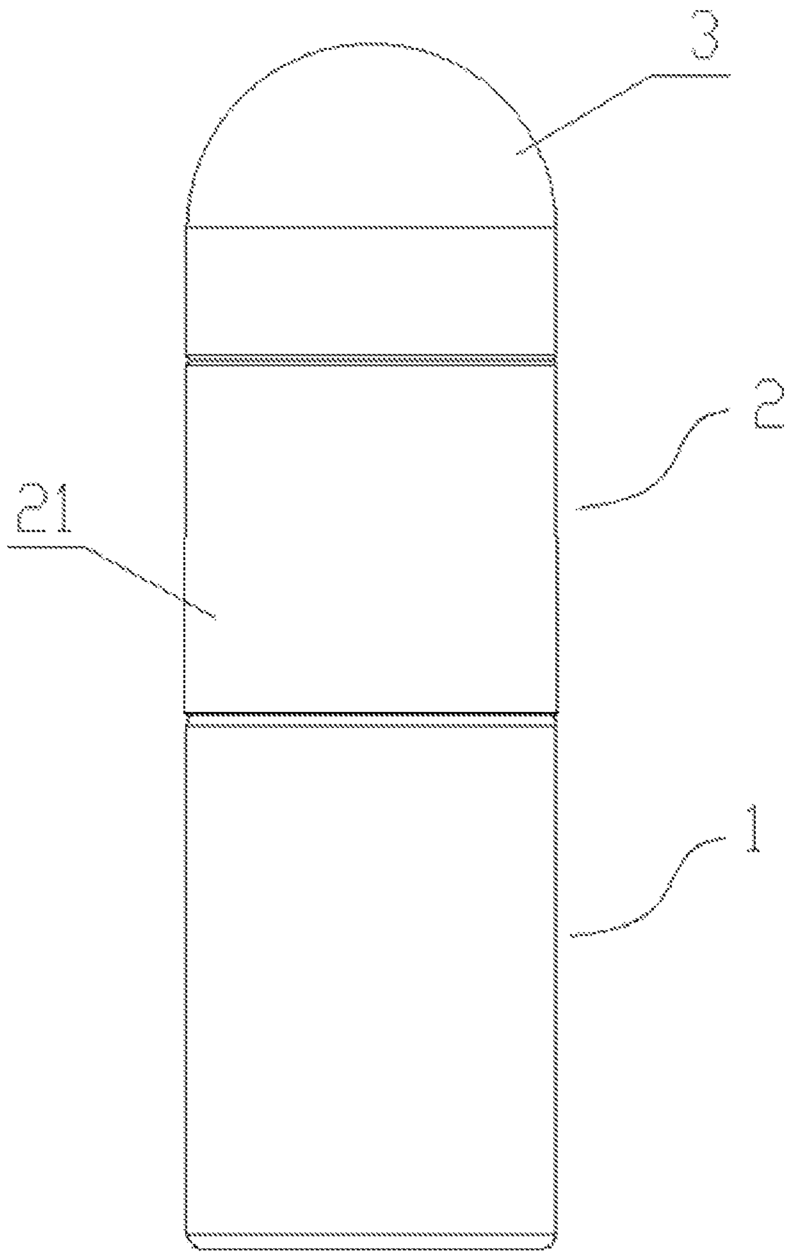
FIG. 1 is a schematic structure diagram of a medicine bottle with an outlet needle in which a main bottle body is connected to a sub-bottle body according to an embodiment of the present disclosure.

Reference signs in the embodiments are as follows:

1, sub-bottle body; 2, main bottle body; 3, housing; 4, outlet needle; 5, central convex plate; 6, central concave; 7, end cover; 8, partition board; 9, venting tube; 10, connection tube; 11, first segment body; 12, second segment body; 13, third segment body; 21, limit cylinder; 22, support tube; 23, gland; 211, first top plate; 212, first side wall; 213, first reinforcing rib; 2111, first clamping projection; 221, support body; 222, blocking plate; 223, third top plate; 224, second reinforcing rib; 225, first load-bearing groove; 231, second clamping projection; 232, first abutting surface; 233, third clamping projection; 31, convex block; 91, hose body; 92, hose cover; 93, gap hole; A, welding line.

DETAILED DESCRIPTION

The embodiments of the technical solution of the disclosure will be described in detail below with reference to the drawings. The following embodiments are used only to more clearly illustrate the technical solution of the present disclosure and are therefore used only as an example rather than limiting the scope of protection of the present disclosure.

Unless otherwise defined, all technical and scientific terms used herein have the same meanings as are generally understood by those skilled in the field of technology of the present disclosure. The terms used herein are used only for the purpose of describing specific embodiments and are not intended to limit the present disclosure. The terms "include" and "have" and any modification thereof in the description and claims of the present disclosure and the above description of the drawings, are intended to cover the non-exclusive inclusion.

In the description of the embodiments of the present disclosure, the technical terms "first", "second" and the like are used only to distinguish different objects, and cannot be understood as indicating or implying relative importance or implicitly indicating the number, particular order or primary and secondary relationship of the indicated technical features. In the description of the embodiments of the present disclosure, "multiple" means more than two, unless otherwise specifically defined.

References to "embodiment" herein mean that particular features, structures or features described in conjunction with embodiments may be included in at least one embodiment of the present disclosure. The presence of this phrase at various locations in the specification does not necessarily refer to the same embodiment, nor to separate or alternative embodiments that are mutually exclusive with other embodiments. Those skilled in the art explicitly and implicitly understand that the embodiments described herein can be combined with other embodiments.

In the description of the embodiments of the present disclosure, the term “and/or” is merely a description of the relationship of the associated object, indicating that there may be three relationships, for example, A and/or B, which may indicate that A exists alone, A and B exist simultaneously, and B exists alone. In addition, the character “/” in this article generally indicates that the associated object is an “or” relationship.

In the description of the embodiments of the present disclosure, the term “multiple” refers to two or more inclusive; and similarly, “multiple sets” refers to two or more inclusive, and “multiple pieces” refers to two or more inclusive.

In the description of the embodiments of the disclosure, azimuths or positional relationships indicated by the technical terms “center”, “longitudinal”, “lateral”, “length”, “width”, “thickness”, “upper”, “lower”, “front”, “rear”, “left”, “right”, “vertical”, “horizontal”, “top”. “bottom”, “inner”, “outer”, “clockwise”, “anti-clockwise”, “axial”, “radial”, “circumferential” and the like are based on the azimuths or positional relationships in the drawings, which are only for the convenience of describing the embodiments of the disclosure and simplifying the description, and are not indicative or implied that a devices or an element definitely has a specific azimuth, or is constructed and operated with a specific azimuth, and therefore they cannot be understood as a limitation to the embodiment of the present disclosure.

In the description of the embodiments of the present disclosure, unless otherwise clearly specified and defined, the technical terms “installation”. “communication”, “connection”, “fixing” and other terms should be broadly understood, for example, it can be a fixed connection, or a detachable connection, or formed in one piece; it can also be a mechanical or electrical connection; it can be directly connected or indirectly connected through an intermediate medium; and it can be a communication within two elements or an interaction between two elements. For those skilled in the art, the specific meanings of the above terms in the embodiment of the present disclosure can be understood according to the specific circumstances.

As shown in FIGS. 1-5, in an embodiment of the present disclosure, a medicine bottle with an outlet needle includes a main bottle body 2 and a sub-bottle body 1. One end of the main bottle body 2 is provided with an outlet needle 4; and the outlet needle 4 communicates with an inner cavity of the main bottle body 2. One end of the sub-bottle body 1 is connected with an end cover 7; one end of the sub-bottle body 1 corresponding to the end cover 7 has a male-connection structure; one end of the main bottle body 2 away from the outlet needle 4 has a female-connection structure; and the male-connection structure is adapted to the female-connection structure. After the end cover 7 is removed, and the male-connection structure of the sub-bottle body 1 is connected to the female-connection structure of the main bottle body 2, the connection between the sub-bottle body 1 and the main bottle body 2 is a fixed and sealed connection; and the sub-bottle body 1 communicates with the inner cavity of the main bottle body 2. The male-connection structure includes an external thread on an outside wall of an end of the sub-bottle body 1 corresponding to the end cover 7; the female-connection structure includes an internal thread on an inside wall of an end of the main bottle body 2 away from the outlet needle 4. When the sub-bottle body 1 is connected to the main bottle body 2, the end of the sub-bottle body 1 corresponding to the end cover 7 is inserted into the end of the main bottle body 2 away from the outlet needle 4; and the external thread of the sub-bottle body 1 is adapted to the internal thread of the main bottle body 2, so that the connection therebetween is the fixed and sealed connection. The inside wall of the end cover 7 is machined with an internal thread, and the internal thread of the end cover 7 is adapted to the external thread of the sub-bottle body 1. With the threaded connection, the main bottle body 2 and the sub-bottle body 1 are integrated and removable for subsequent replacement of the sub-bottle body 1.

A housing 3 is provided around one end of the main bottle body 2 corresponding to the outlet needle 4. The housing 3 can protect the outlet needle 4 from dust in idle.

A partition board 8 is provided in the inner cavity of the main bottle body 2. A board surface of the partition board 8 is fixedly connected in the inner cavity of the main bottle body 2; and the partition board 8 is hollowed out. After the sub-bottle body 1 is connected to the main bottle body 2, the sub-bottle body 1 abuts against the partition board 8. During the installation, the partition board 8 can be configured to position the sub-bottle body 1.

Figure 5:
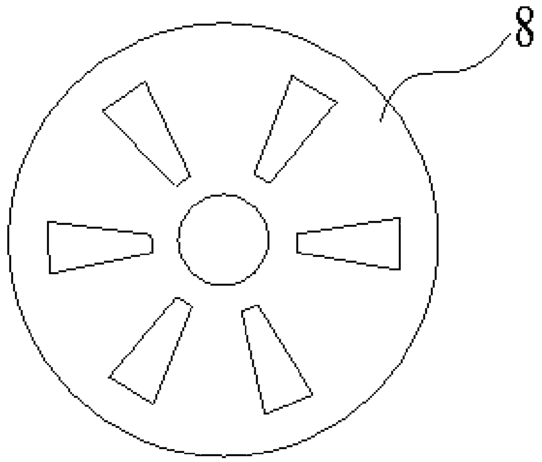
FIG. 5 is a schematic diagram of a partition board according to an embodiment of the present disclosure.

Specifically, referring to FIG. 5, the hollowed-out structure of the partition board 8 is a porous structure which passes through in an axial direction and the multiple holes are spaced apart in a circumferential direction of a central axis of the partition board 8. The number of the holes correspond to the number of the outlet needles 4, and the end of the porous structure communicating with the outlet needles 4 directly communicates with the outlet needles 4.

Figure 2:
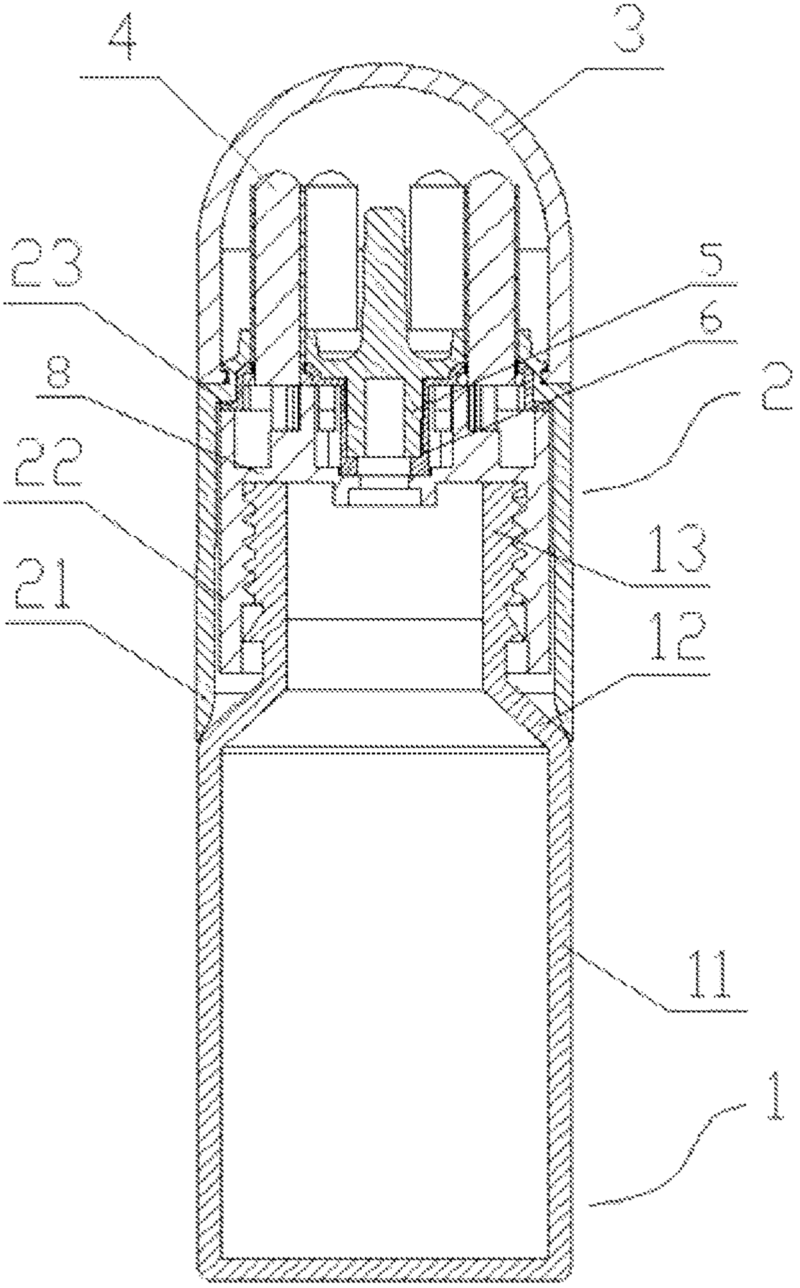
FIG. 2 is a section view of the structure in FIG. 1 along a central axial plane according to an embodiment of the present disclosure.
Figure 3:
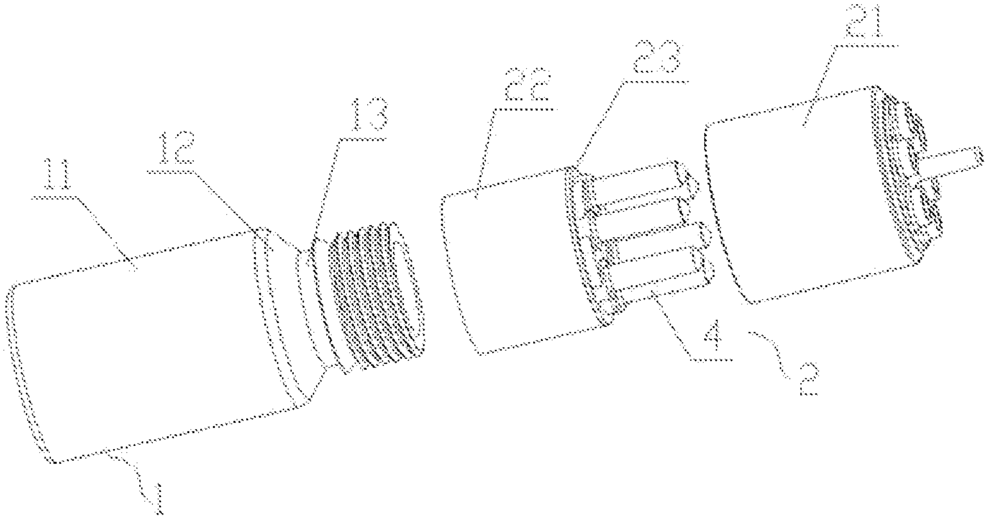
FIG. 3 is a schematic decomposition diagram of the structure in FIG. 1 according to an embodiment of the present disclosure.
Figure 4:
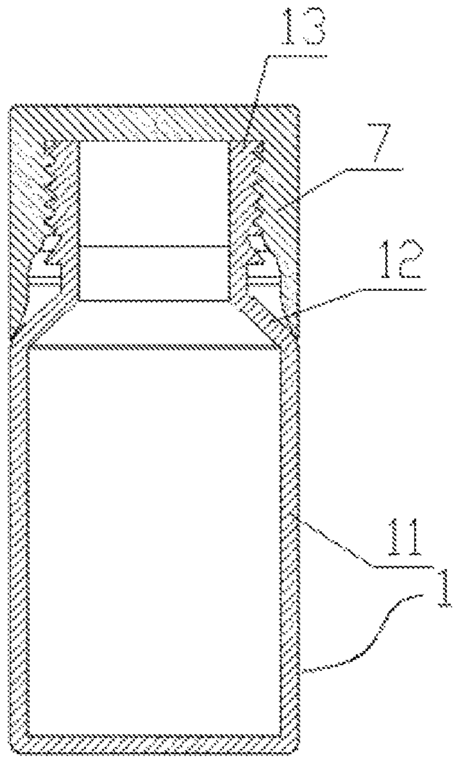
FIG. 4 is a structure diagram of the sub-bottle body in FIG. 2 according to an embodiment of the present disclosure.

As shown in FIG. 2, the main bottle body 2 includes a support tube 22 and a limit cylinder 21. One end of the support tube 22 is an abutting end, and the other end has a gland 23 on which the outlet needles 4 are located. The limit cylinder 21 concentrically sleeves outside the support tube 22; and a bottom of the limit cylinder 21 is pressed against the gland 23, so that the gland 23 is positioned between the support tube 22 and the limit cylinder 21. The bottom of the limit cylinder 21 corresponding to the outlet needles 4 is provided with letting holes for the outlet needles to protrude through. The gland 23 is limited by means of the limit cylinder 21, so that the gland 23 is separated from the support tube 22. When the outlet needle 4 needs to be cleaned, the outlet needle 4 is pushed inwards so that the support tube 22 and the gland 23 slide out of an opening of the limit cylinder 21, and the gland 23 can be removed for cleaning.

In order to facilitate the positioning, a central convex plate 5 is provided on an inner surface of the bottom of the limit cylinder 21, and a central concave 6 adapted to the central convex plate 5 is provided on the gland 23, and the central convex plate 5 is located in the central concave 6.

For the sake of aesthetic, the sub-bottle body 1 includes a first segment body 11, a second segment body 12, and a third segment body 13. The first segment body 11 and the third segment body 13 both have fixed diameters; the second segment body 12 has a changing diameter. The diameter of the first segment body 11 is larger than that of the third segment body 13; one end of the first segment body 11 is a closed end, the other end is connected to an end of the second segment body 12 with a larger diameter; an end of the second segment body 12 with a smaller diameter is connected to an end of the third segment body 13. The end cover 7 is located at the other end of the third segment body 13; the external thread is machined on the outside wall of the third segment body 13. The outer diameter of the first segment body 11 is equal to the outer diameter of the limit cylinder 21. The opening end of the limit cylinder 21 protrudes from the end of the support tube 22 away from the gland 23, so that the opening end of the limit cylinder 21 encloses the second segment body 12 after the main bottle body 2 is connected to the sub-bottle body 1.

For ease of use, the gland 23 is provided with a plurality of liquid guide needles.

In the embodiment, the partition board is integrated with the support tube.

When such medicine bottle is manufactured, the liquid medicine is added into the sub-bottle body 1. In the sale process, not less than two sub-bottle bodies 1 and one main bottle body 2 are sold in sets. During abutting, the end cover 7 of the sub-bottle body 1 is removed, and the sub-bottle body 1 is fixedly connected to and sealed with the main bottle body 2 through the male-female connection structure. After the coating is completed, the sub-bottle body 1 does not need to be removed and waits for the next use until the liquid medicine in the sub-bottle body 1 is fully consumed. Then the sub-bottle body 1 after use is removed, and a new sub-bottle body 1 is connected to the main bottle body 2 before reusing. The operation process of the medicine bottle is simple, the medicine is not easy to be invalidated by oxidation, and the treatment effect is better, which does not harm the health of the patient.

In addition, as for the disclosure, in order to address the problem that the air in the liquid medicine cannot be expelled in time during the application of the medicine bottle, resulting in a slow outlet effect, another medicine bottle with an outlet needle is provided.

Referring to FIGS. 6-14, the present disclosure further provides a medicine bottle with an outlet needle, including: a main bottle body 2, one end of the main bottle body 2 is provided with an outlet needle 4, and the outlet needle 4 communicates with an inner cavity of the main bottle body 2. The medicine bottle with the outlet needle 4 further includes a sub-bottle body 1, one end of the sub-bottle body 1 is connected with an end cover 7, and one end of the sub-bottle body 1 corresponding to the end cover 7 is provided with a male-connection structure; and one end of the main bottle body 2 away from the outlet needle 4 is provided with a female-connection structure; the male-connection structure is adapted to the female-connection structure. When the end cover 7 is open to the main bottle body 1, the male-connection structure of the sub-bottle body 1 is connected to the female-connection structure of the main bottle body 2; and the connection therebetween is a fixed and sealed connection. The sub-bottle body 1 communicates with the inner cavity of the main bottle body 2.

Specifically, the male-connection structure includes the external thread on the outside wall of one end of the sub-bottle body 1 corresponding to the end cover 7; the female-connection structure includes the internal thread on the inner wall of one end of the main bottle body 2 away from the outlet needle 4. When the sub-bottle body 1 is connected to the main bottle body 2, the end of the sub-bottle body 1 corresponding to the end cover 7 is inserted into the end of the main bottle body 2 away from the outlet needle 4; and the external thread of the sub-bottle body 1 is adapted to the internal thread of the main bottle body 2, so that the connection therebetween is the fixed and sealed connection. The inside wall of the end cover 7 is machined with the internal thread, and the internal thread of the end cover 7 is adapted to the external thread of the sub-bottle body 1.

Specifically, a housing 3 is provided around the end of the main bottle body 2 corresponding to the outlet needle 4.

Specifically, the main bottle body 2 includes a support tube 22 and a limit cylinder 21. One end of the support tube 22 is an abutting end, and the other end has a gland 23 on which the outlet needles 4 are located. The limit cylinder 21 concentrically sleeves outside the support tube 22; and a bottom of the limit cylinder 21 is pressed against the gland 23, so that the gland 23 is positioned between the support tube 22 and the limit cylinder 21. The bottom of the limit cylinder 21 corresponding to the outlet needles 4 is provided with letting holes for the outlet needles to protrude.

Figure 11:
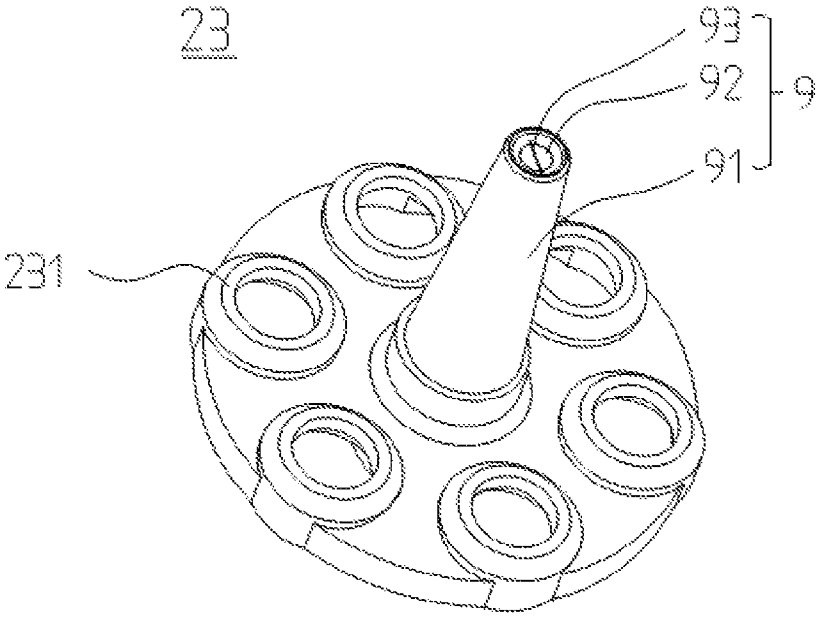
FIG. 11 is a schematic structure diagram I of a gland in FIG. 6 according to another embodiment of the present disclosure.
Figure 12:
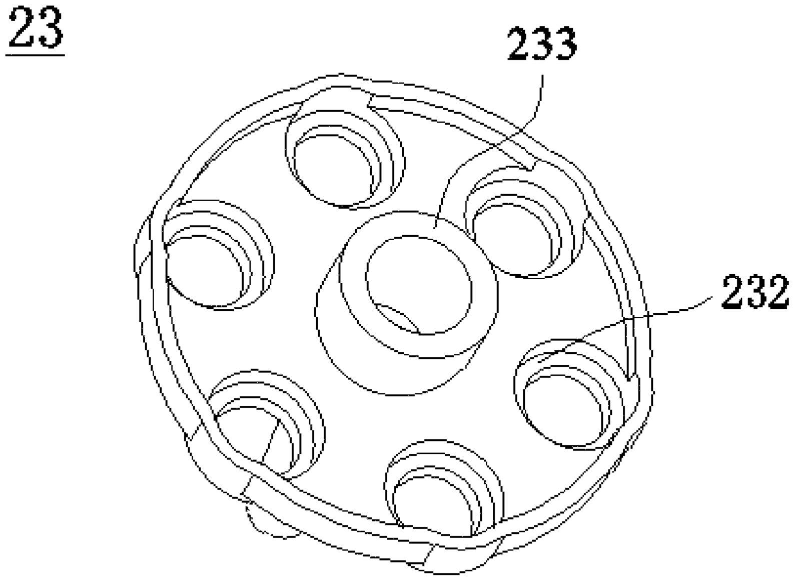
FIG. 12 is a schematic structure diagram II of a gland in FIG. 6 according to another embodiment of the present disclosure.

Specifically, referring further to FIG. 11, a top surface structure of the gland 23 is flat. The top surface structure of the gland 23 is constructed to be flat, which prevents breakage in a position on the gland 23 to which the connection tube 10 is connected.

Specifically, a liquid passage is formed between the main bottle body 2 and the sub-bottle body 1 for the liquid medicine to flow to the outlet needle 4.

Specifically, a partition board 8 is provided in the inner cavity of the main bottle body 2. A board surface of the partition board 8 is fixedly connected in the inner cavity of the main bottle body 2; and the partition board 8 is hollowed out. After the sub-bottle body 1 is connected to the main bottle body 2, the sub-bottle body 1 abuts against the partition board 8. The hollowed-out structure of the partition board 8 forms the liquid passage.

Specifically, an air passage is formed between the main bottle body 2 and the sub-bottle body 1 to flow excess air in the liquid medicine into the atmosphere. Accordingly, it is ensured that the stored air can be expelled from the bottle in time during the application of the medicine bottle, so that the air pressure in the medicine bottle is consistent with the atmospheric pressure, and the flow rate of the liquid is further improved.

For example, the liquid passage is separated from the air passage. The liquid passage communicates with the outlet needles 4, so that the liquid medicine in the sub-bottle body 1 is extruded out smoothly through the outlet needles 4 by pressing.

For example, the number of outlet needles 4 may be six, or less than or more than six.

For example, the outlet needles 4 of the present disclosure may have a size adapted to application on the medicine bottle according to different types.

Specifically, a surface of the partition board 8 adjacent to the sub-bottle body 1 is configured as a hole-shaped structure arranged through the axial direction; a surface of the partition board 8 away from the sub-bottle body 1 is provided with an installation portion; the air passage passes through the installation portion and the hole-shaped structure and is immersed in the liquid medicine in the sub-bottle body 1. A liquid passage is formed between an inner wall of the hole-shaped structure and an outer wall of the air passage.

For example, the hole-shaped structure of the partition board 8 may be an overall petal-shaped hole structure, or an overall angular hole structure, or an overall polygonal hole structure.

Specifically, the connection between the top surface of the support tube 22 and the top wall of the limit cylinder 21 remains sealed.

Specifically, the connection between the support tube 22 and the top wall of the limit cylinder 21 is sealed and welded, and a welding line A is formed therebetween. The support tube 22 is connected to the limit cylinder 21 by sealing and welding, which can make the sealing effect therebetween excellent, and can achieve a long-term continuous sealing effect to prevent leakage.

For example, the limit cylinder 21 can be constructed as an alloy injection mold.

For example, the support tube 22 may be constructed as a flexible plastic.

For example, the support tube 22 may have a silicone structure.

Figure 7:
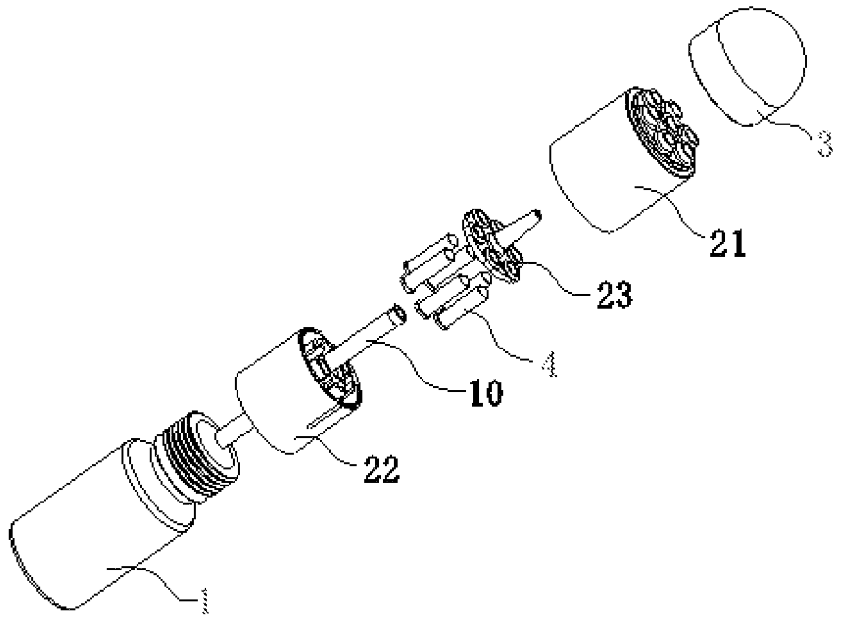
FIG. 7 is a schematic decomposition diagram of the structure of the medicine bottle in FIG. 5 according to another embodiment of the present disclosure.
Figure 8:
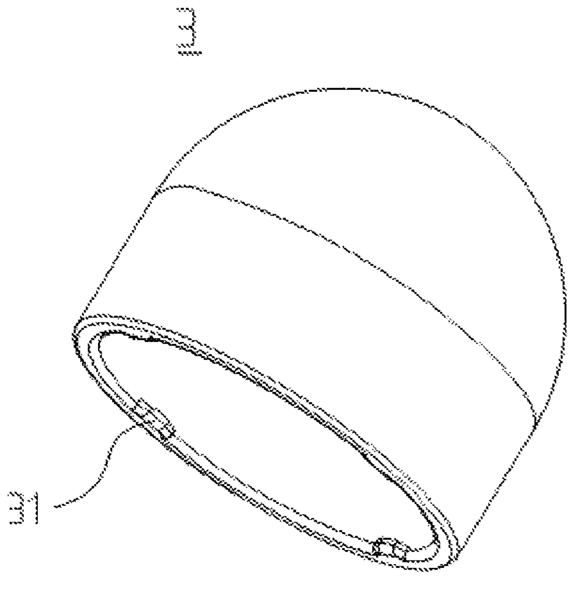
FIG. 8 is a schematic structure diagram of a housing in FIG. 6 according to another embodiment of the present disclosure.
Figure 9:
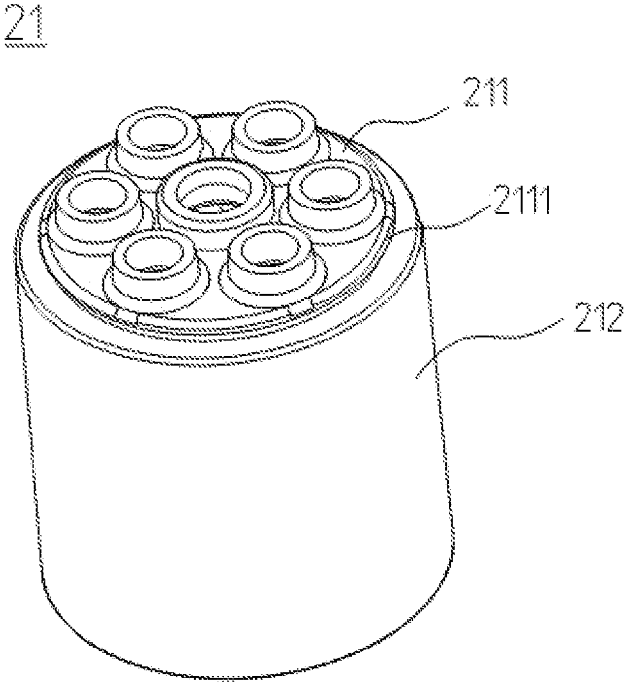
FIG. 9 is a schematic structure diagram I of a limit cylinder in FIG. 6 according to another embodiment of the present disclosure.
Figure 10:
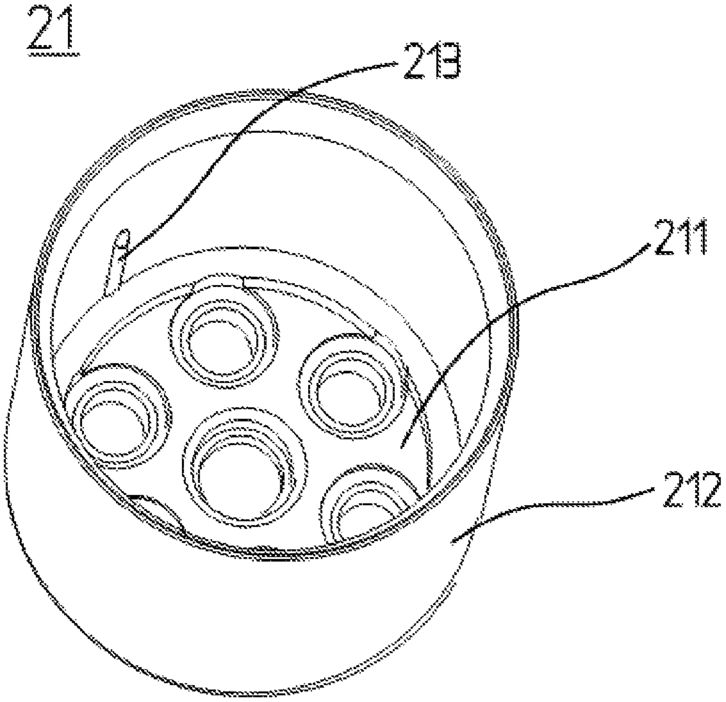
FIG. 10 is a schematic structure diagram II of a limit cylinder in FIG. 6 according to another embodiment of the present disclosure.

Specifically, referring to FIG. 7, FIG. 9, and FIG. 10, in the flow direction of the liquid, the limit cylinder 21 includes a first top plate 211 located on a top surface and a first side wall 212 connected to a bottom surface of the first top plate 211; the first top plate 211 protrudes from a top surface of the first side wall 212, and a first clamping projection 2111 is provided at a connection between the first top plate 211 and the first side wall 212; accordingly, an edge of the opening of the housing 3 is provided with convex blocks 31; and an outer periphery of the first clamping projection 2111 is provided with receiving grooves configured to receive at least some convex blocks 31; a detachable clamping connection is provided between the top surface of the receiving groove and the top surface of the convex block 31. A detachable clamping connection is provided between the housing 3 and the limit cylinder 21 to prevent the liquid medicine in the sub-bottle body 1 from becoming ineffective after the housing 3 is inadvertently opened.

For example, the first top plate 211, the first side wall 212, and the first clamping projection 2111 in the present disclosure can be formed in one piece to facilitate injection molding at one time and save the technological processes.

For example, the convex blocks 31 and the housing 3 in the present disclosure are formed in one piece to facilitate injection molding at one time and save the technological processes.

The present application does not limit the structure, shape, and size of the first clamping projection 2111, the receiving groove, and the convex block 31, as long as a detachable clamping connection of the convex block 31 with respect to the first clamping projection 2111 can be implemented. The detachable clamping connection can be implemented by a rounded corner transition structure of the convex block 31, or the detachable clamping connection can also be implemented by a micro-deformed snap-shaped convex block 31.

Figure 13:
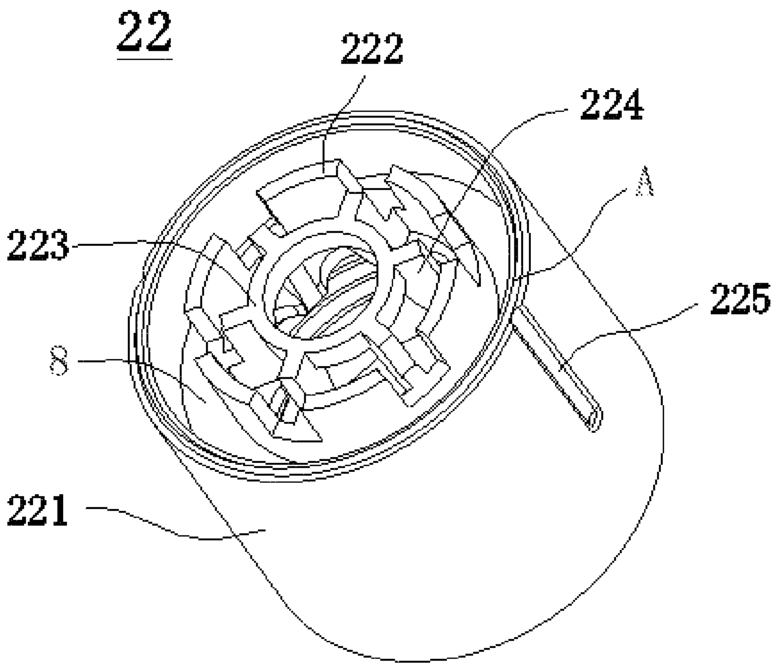
FIG. 13 is a schematic structure diagram I of a support tube in FIG. 6 according to another embodiment of the present disclosure.
Figure 14:
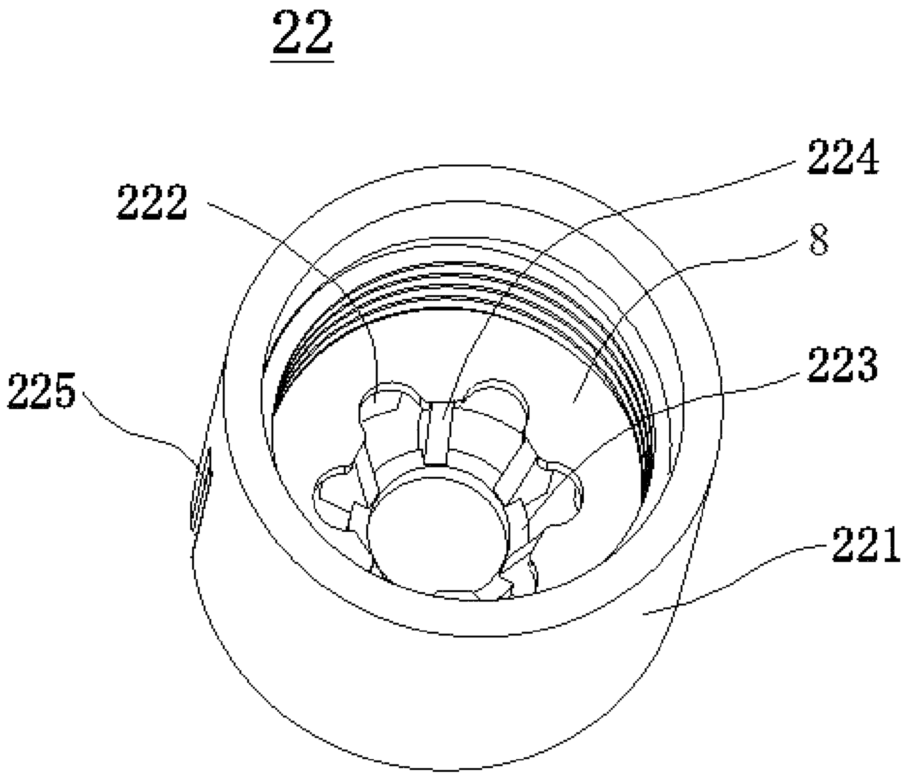
FIG. 14 is a schematic structure diagram II of a support tube in FIG. 6 according to another embodiment of the present disclosure.

Specifically, referring to FIGS. 7, 13, and 14, the support tube 22 includes a support body 221; an installation portion is constructed as a third top plate 223 provided in a radial direction of the support body 221; the partition board 8 is provided radially across the inner wall of the support body 221, and the partition board 8 is spaced apart from the third top plate 223, and a plurality of reinforcing ribs 224 are connected between the partition board 8 and the third top plate 223; each second reinforcing rib 224 is arranged in a circumferential direction of the third top plate 223. The partition board 8 is provided with a hole-shaped structure. A plurality of blocking plates 222 are arranged axially on the partition board 8 adjacent to the second reinforcing ribs 224. A liquid passage is formed among the partition board 8, two adjacent second reinforcing ribs 224, and the third top plate 223.

The support tube 22 is provided with the above-mentioned hole-shaped structure, which can allow the medicine bottle to provide the liquid medicine for the outlet needles 4 in time during the application process. Each second reinforcing rib 224 is connected between the partition board 8 and the third top plate 223, which results in an increase in the overall structural strength of the support tube 22.

For example, the support tube 22 in the present disclosure may have a silicone structure formed in one piece by the injection molding.

For example, the thickness size of each plate-shaped structure or top plate structure in the present disclosure is not limited, alternatively which can be understood as a sheet structure or a block structure.

Specifically, referring further to FIGS. 10 and 13, the inner wall of the first side wall 212 is provided with at least one first reinforcing rib 213 in the axial direction thereof. Accordingly, the outer wall of the support body 221 is provided with at least one first load-bearing groove 225 in the axial direction thereof; and the first load-bearing groove 225 is matched with the first reinforcing rib 213.

A circumferential rotation between the support tube 22 and the limit cylinder 21 can be prevented.

The present application does not limit the shapes, structures and sizes of the first reinforcing rib 213 and the first load-bearing groove 225 provided they can fit together and can prevent the circumferential rotation between the support tube 22 and the limit cylinder 21.

Specifically, a second clamping projection 231 is provided on and protrudes from the top surface of the gland 23. The second clamping projection 231 is provided with a via hole for the outlet needle 4 to protrude through. The bottom surface of the gland 23 is concave and is provided with a first abutting surface 232; and the first abutting surface 232 is arranged along the edge of the via hole. A bottom projection structure is provided between the first abutting surface 232 and the top surface of the blocking plate 222 and is configured to install and fix the outlet needle 4.

The projection structure of the bottom portion of the outlet needle 4 is positioned and installed between the first abutting surface 232 and the top surface of the blocking plate 222, which can improve the installation stability of the outlet needle 4 without requiring an additional limit structure for fixing and installing the outlet needle 4.

Specifically, the limit cylinder 21 includes a first top plate 211 on the top surface and a first side wall 212 connected to the bottom surface of the first top plate 211; the first top plate 211 is provided and protrudes from the top surface of the first side wall 212, and a first clamping projection 2111 is provided at the connection therebetween. Accordingly, an edge of the opening of the housing 3 is provided with convex blocks 31; and an outer periphery of the first clamping projection 2111 is provided with receiving grooves configured to receive at least some convex blocks 31; a detachable clamping connection is provided between the top surface of the receiving groove and the top surface of the convex block 31.

A detachable clamping connection is provided between the housing 3 and the limit cylinder 21 to prevent the liquid medicine in the sub-bottle body 1 from becoming ineffective after the housing 3 is inadvertently opened.

Figure 6:
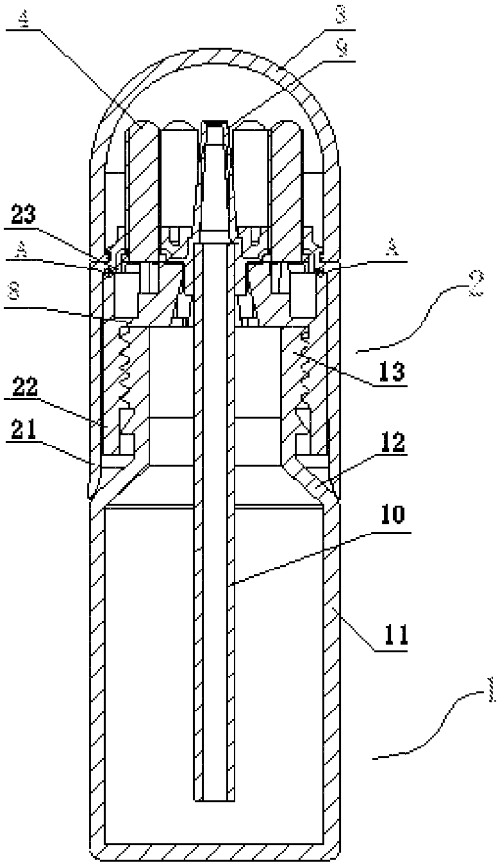
FIG. 6 is a section view of a medicine bottle along a central axial plane according to another embodiment of the present disclosure.

Specifically, referring to FIG. 6, FIG. 7 and FIG. 11, a venting tube 9 is provided on and protrudes from the top surface of the gland 23; and the venting tube 9 at a bottom portion thereof communicates with a connection tube 10; the connection tube 10 is configured to extend into a liquid level of the sub-bottle body 1. The venting tube 9 and the connection tube 10 together form the air passage.

Specifically, the venting tube 9 is constructed to be a plastic structure.

Specifically, the venting tube 9 includes a hose body 91 which is gradually reduced in a radial dimension along an outflow direction of the liquid. The top surface of the hose body 91 is provided with a hose cover 92; and the hose cover 92 is provided with a gap hole 93 for the air to flow.

The air in the liquid medicine in the sub-bottle body 1 can be timely expelled into the atmosphere through the gap hole 93, such that the air pressure in the sub-bottle body 1 is consistent with the atmospheric pressure.

The venting tube 9 in the present disclosure may be a plastic tube.

Specifically, a third clamping projection 233 is provided on and protrudes from the bottom surface of the gland 23, which is configured to perform a nested installation with the connection tube 10.

Specifically, the board surface of the partition board 8 and the inner cavity of the main bottle body 2 are formed in one piece.

For the sake of aesthetic, the sub-bottle body 1 includes a first segment body 11, a second segment body 12, and a third segment body 13. The first segment body 11 and the third segment body 13 both have fixed diameters; the second segment body 12 has a changing diameter. The diameter of the first segment body 11 is larger than that of the third segment body 13; one end of the first segment body 11 is a closed end, the other end is connected to an end of the second segment body 12 with a larger diameter; an end of the second segment body 12 with a smaller diameter is connected to an end of the third segment body 13. The end cover 7 is located at the other end of the third segment body 13; the external thread is machined on the outside wall of the third segment body 13. The outer diameter of the first segment body 11 is equal to the outer diameter of the limit cylinder 21. The opening end of the limit cylinder 21 protrudes from an end of the support tube 22 away from the gland 23, so that the opening end of the limit cylinder 21 encloses the second segment body 12 after the main bottle body 2 is connected to the sub-bottle body 1.

In the application process, various components of the medicine bottle are assembled together, and the liquid medicine can be applied to the skin through the outlet needle 4 by pressing the outlet needle 4 on the skin surface in use.

The limitations in the above embodiments can be arbitrarily combined. In order to make the description concise, all possible combinations of the limitations in the above embodiments are not described. However, as long as there is no contradiction in the combination of these limitations, they should be considered as the scope of the present disclosure.

The embodiments described above are merely some embodiments of the present disclosure, which are described in more specific and detail, but are not thereby understood as limiting the scope of the present disclosure. It should be noted that those skilled in the art can make a number of modifications and improvements without departing from the concept of the present disclosure, which fall within the scope of protection of the present disclosure. Therefore, the scope of protection of the present disclosure should be subject to the attached claims.

What is claimed is:

1. A medicine bottle with an outlet needle, comprising a main bottle body, an end of the main bottle body being provided with the outlet needle, and the outlet needle communicating with an inner cavity of the main bottle body; further comprising a sub-bottle body, an end of the sub-bottle body being connected with an end cover, and the end of the sub-bottle body corresponding to the end cover having a male-connection structure, an end of the main bottle body away from the outlet needle having a female-connection structure, the male-connection structure being adapted to the female-connection structure, a connection between the sub-bottle body and the main bottle body being a fixed and sealed connection after the end cover is removed and the male-connection structure of the sub-bottle body is connected to the female-connection structure of the main bottle body, and the sub-bottle body communicating with the inner cavity of the main bottle body;

wherein the male-connection structure comprises an external thread on an outside wall of an end of the sub-bottle body corresponding to the end cover, the female-connection structure comprises an internal thread on an inside wall of an end of the main bottle body away from the outlet needle, the end of the sub-bottle body corresponding to the end cover is inserted into the end of the main bottle body away from the outlet needle when the sub-bottle body is connected to the main bottle body, and the external thread of the sub-bottle body is adapted to the internal thread of the main bottle body, such that the connection between the sub-bottle body and the main bottle body is the fixed and sealed connection, an inside wall of the end cover is machined with an internal thread, and the internal thread of the end cover is adapted to the external thread of the sub-bottle body;

wherein a housing is provided around the end of the main bottle body corresponding to the outlet needle;

wherein the main bottle body comprises a support tube and a limit cylinder, one end of the support tube is an abutting end, and the other end has a gland on which the outlet needle is located, the limit cylinder concentrically sleeves outside the support tube, and a bottom of the limit cylinder is pressed against the gland, such that the gland is positioned between the support tube and the limit cylinder, the bottom of the limit cylinder corresponding to the outlet needle is provided with a letting hole for the outlet needle to protrude through; wherein a top surface structure of the gland is constructed to be flat;

wherein a liquid passage is formed between the main bottle body and the sub-bottle body for a liquid medicine to flow to the outlet needle;

wherein a partition board is provided in the inner cavity of the main bottle body, a board surface of the partition board is fixedly connected in the inner cavity of the main bottle body, the partition board is hollowed out, the sub-bottle body abuts against the partition board after the sub-bottle body is connected to the main bottle body, a hollowed-out structure of the partition board forms the liquid passage;

wherein an air passage is formed between the main bottle body and the sub-bottle body to flow excess air in the liquid medicine into atmosphere;

wherein a surface of the partition board adjacent to the sub-bottle body is configured as a hole-shaped structure arranged through the axial direction, a surface of the partition board away from the sub-bottle body is provided with an installation portion, the air passage passes through the installation portion and the hole-shaped structure and is immersed in the liquid medicine in the sub-bottle body, and the liquid passage is formed between an inner wall of the hole-shaped structure and an outer wall of the air passage;

wherein the connection between a top surface of the support tube and a top wall of the limit cylinder remains sealed;

wherein the connection between the support tube and the top wall of the limit cylinder is a sealed and welded connection, and a welding line is formed therebetween.

2. The medicine bottle with the outlet needle according to claim 1, wherein a central convex plate is provided on an inner surface of the bottom of the limit cylinder, a central concave adapted to the central convex plate is provided on the gland, and the central convex plate is located in the central concave.

3. The medicine bottle with the outlet needle according to claim 1, wherein the hollowed-out structure of the partition board is a porous structure which passes through in an axial direction and the multiple holes are spaced apart in a circumferential direction of a central axis of the partition board, the number of the holes correspond to the number of outlet needles, and an end of the porous structure communicating with the outlet needles directly communicates with the outlet needles.

4. The medicine bottle with the outlet needle according to claim 1, wherein the support tube comprises a support body, an installation portion is constructed as a third top plate provided in a radial direction of the support body, the partition board is provided radially across an inner wall of the support body, the partition board is spaced apart from the third top plate, a plurality of reinforcing ribs are connected between the partition board and the third top plate, each second reinforcing rib is arranged in a circumferential direction of the third top plate, the partition board is provided with the hole-shaped structure, a plurality of blocking plates are arranged axially on the partition board adjacent to the second reinforcing ribs, the liquid passage is formed among the partition board, two adjacent second reinforcing ribs, and the third top plate.

5. The medicine bottle with the outlet needle according to claim 4, wherein an inner wall of the first side wall is provided with at least one first reinforcing rib in an axial direction thereof, an outer wall of the support body is provided with at least one first load-bearing groove in an axial direction thereof, and the first load-bearing groove is matched with the first reinforcing rib.

6. The medicine bottle with the outlet needle according to claim 4, wherein a second clamping projection is provided on and protrudes from the top surface of the gland, the second clamping projection is provided with a via hole for the outlet needle to protrude through, the bottom surface of the gland is concave and is provided with a first abutting surface, the first abutting surface is arranged along an edge of the via hole, a bottom projection structure is provided between the first abutting surface and the top surface of the blocking plate and is configured to install and fix the outlet needle.

7. The medicine bottle with the outlet needle according to claim 1, wherein the limit cylinder comprises a first top plate located on a top surface and a first side wall connected to a bottom surface of the first top plate, the first top plate protrudes from a top surface of the first side wall, a first clamping projection is provided at a connection between the first top plate and the first side wall; an edge of an opening of the housing is provided with a convex block, and a detachable clamping connection is provided between the convex block and the first clamping projection.

8. The medicine bottle with the outlet needle according to claim 1, wherein a venting tube is provided on and protrudes from the top surface of the gland, and the venting tube at a bottom portion thereof communicates with a connection tube, the connection tube is configured to extend into a liquid level of the sub-bottle body;

the venting tube and the connection tube together form the air passage.

9. The medicine bottle with the outlet needle according to claim 8, wherein the venting tube is constructed to be a plastic structure.

10. The medicine bottle with the outlet needle according to claim 8, wherein the venting tube comprises a hose body which is gradually reduced in a radial dimension along an outflow direction of the liquid, a top surface of the hose body is provided with a hose cover, and the hose cover is provided with a gap hole for air to flow.

11. The medicine bottle with the outlet needle according to claim 8, wherein a third clamping projection is provided on and protrudes from the bottom surface of the gland, and the third clamping projection is configured to perform a nested installation with the connection tube.

12. The medicine bottle with the outlet needle according to claim 1, wherein the board surface of the partition board and the inner cavity of the main bottle body are formed in one piece.

13. The medicine bottle with the outlet needle according to claim 1, wherein the sub-bottle body comprises a first segment body, a second segment body, and a third segment body; the first segment body and the third segment body both have fixed diameters, the second segment body has a changing diameter; a diameter of the first segment body is larger than that of the third segment body; one end of the first segment body is a closed end, the other end is connected to an end of the second segment body with a larger diameter; an end of the second segment body with a smaller diameter is connected to an end of the third segment body; the end cover is located at the other end of the third segment body; the external thread is machined on an outside wall of the third segment body; an outer diameter of the first segment body is equal to an outer diameter of the limit cylinder; the opening end of the limit cylinder protrudes from an end of the support tube away from the gland, such that the opening end of the limit cylinder encloses the second segment body after the main bottle body is connected to the sub-bottle body.

* * * * *